(12) United States Patent
Yang (10) Patent No.: US 6,417,989 B1
(45) Date of Patent: Jul. 9, 2002

(54) MULTIPLE-GAP MAGNETIC THIN-FILM HEAD WITH IMPROVED READ/WRITE COIL ARRANGEMENT

(75) Inventor: Kuo-Nan Yang, Saratoga, CA (US)

(73) Assignee: AIWA Co., Ltd., Tokyo (JP)

( * ) Notice: Subject to any disclaimer, the term of this patent is extended or adjusted under 35 U.S.C. 154(b) by 22 days.

(21) Appl. No.: 09/593,329

(22) Filed: Jun. 14, 2000

(51) Int. Cl.⁷ .................................................. G11B 5/265
(52) U.S. Cl. ...................................... 360/121; 360/318.1
(58) Field of Search ............................... 360/317–318.1, 360/121, 126

(56) References Cited

U.S. PATENT DOCUMENTS

| | | | |
|---|---|---|---|
| 4,949,207 A | 8/1990 | Lazzari | 360/119 |
| 5,029,032 A | 7/1991 | Yamada et al. | 360/126 |
| 5,132,859 A | 7/1992 | Andricacos et al. | 360/113 |
| 5,153,980 A * | 10/1992 | Kira | 360/121 |
| 5,382,305 A | 1/1995 | Terunuma et al. | 148/306 |
| 5,432,645 A | 7/1995 | Terunuma et al. | 360/126 |
| 5,452,165 A * | 9/1995 | Chen | 360/121 |
| 5,490,028 A | 2/1996 | Ang et al. | 360/126 |
| 5,541,793 A * | 7/1996 | Schwarz | 360/121 |
| 5,563,754 A | 10/1996 | Gray et al. | 360/126 |
| 5,742,457 A * | 4/1998 | Simmons | 360/121 |
| 5,748,417 A | 5/1998 | Malhora et al. | 360/126 |
| 5,801,909 A | 9/1998 | Gray et al. | 360/126 |
| 5,909,346 A | 6/1999 | Malhora et al. | 360/126 |
| 5,912,779 A * | 6/1999 | Llewellyn | 360/121 |
| 5,950,301 A | 9/1999 | Gray et al. | 29/603.12 |

* cited by examiner

Primary Examiner—A. J. Heinz
(74) Attorney, Agent, or Firm—Skjerven Morrill LLP; David W. Heid (57) ABSTRACT

Read and write performance in a magnetic thin-film head is improved by forming a highly compact multiple-gap head with separate magnetic core and coil structures for a read head and a write head that are respectively designed to improve reading and writing performance. A thin film magnetic head includes a thin-film magnetic core including a read core portion and an interconnected write core portion, a thin-film read coil encircling the read core portion, and a thin-film write coil encircling the write core portion. The read core portion is separated by a read magnetic gap and the write core portion being separated by a write magnetic gap. The read gap and write gap are mutually combined in close proximity in abutting sections of the read core portion and the write core portion respectively so that a magnetic medium is accessible to the read gap and the write gap simultaneously.

25 Claims, 8 Drawing Sheets

MULTIPLE-GAP MAGNETIC THIN-FILM HEAD WITH IMPROVED READ/WRITE COIL ARRANGEMENT

BACKGROUND OF THE INVENTION

1. Field of the Invention

The present invention relates to thin-film magnetic recording and playback heads. More specifically, the present invention relates to thin-film magnetic recording and playback heads having a multiple-gap structure and combined read and write heads.

2. Description of the Related Art

A magnetic head for reading and writing a magnetic media operates by respectively detecting and creating magnetic domains on the magnetic recording media. The fundamental structure of a read/write head includes an magnetic material core with a small portion removed to form a gap for passing a magnetic field. The magnetic core is encircled by coils through which a current flows to induce a magnetic field in the magnetic core. In conventional magnetic heads, head coils typically include 8 to 34 turns of extremely fine varnish-coated wire. The magnetic field interacts with particles on the magnetic recording media at the gap to read and write the media. Writing of the magnetic media occurs when the electric current flows through the coil, developing a magnetic field across the gap that orients particles on the magnetic media in a pattern parallel to the direction of the magnetic flux. Reading of the magnetic media occurs when the head gap passes over a magnetic field transition, inducing a field into the magnetic core that further induces a current flow in the coil.

Thus, the magnetic head initiates write operations by supplying current to the coils and the magnetic media encodes flux transitions that are generated by the current into the head coils. Generally lower write currents are desirable since the lower currents produce less electrical stress on the magnetic head, improving head reliability.

The fabrication of conventional and composite magnetic heads involves significant piecework and manual handling of individual parts such as laborious winding of tiny coil wires around minuscule magnetic cores. The manual fabrication of conventional and composite heads is unproductive and costly. Magnetic thin-film heads have been developed to achieve high data density in magnetic media while eliminating many of the problems associated with conventional and composite magnetic heads. The fabrication of magnetic thin-film heads exploits semiconductor fabrication processes to form a large number of heads simultaneously on a common substrate or wafer. Magnetic thin-film heads are fabricated using the photochemical techniques that are conventionally employed to manufacture semiconductor chips for forming an electromagnetic slider. In the manner of thin film head fabrication, many sliders are created on a single wafer which is ultimately sliced into individual sliders. Magnetic thin-film heads are similar to conventional and composite sliders in that heads typically include air gaps and magnetic coils having 8 to 34 wire coils. Nickel-iron cores are typically used in thin-film heads.

Magnetic thin-film heads advantageously are more durable than conventional and composite magnetic heads, support lower flying heights and thus greater bit densities, and have smaller and lighter heads so improve track density and quicken access times. Thin film heads typically support track densities of 10,000 tpi and more, data transfer frequencies up to and beyond 100 Mhz, and flying heights as small as 5 micro inches.

Thin-film magnetic heads that perform both read and write operations have been previously constructed as distinct read reads and distinct write heads in the form of individual, discrete structures. The minimum spacing between heads has been a function of the number of heads that could practically be fabricated in a substrate area and the minimum physical area upon which the individual, discrete structures are mounted. Ideally, electromagnetic heads are positioned in as small an area and as closely spaced as possible to attain a high bit density, and also to reduce component size, energy consumption, and weight. Smaller and more closely spaced heads significantly increase the amount of data that is stored on a magnetic media.

What is needed is a read-write head that increases the density of data stored on magnetic media, a read-write head that is smaller in size for usage in smaller head arrays.

SUMMARY

It has been discovered that read and write performance in a magnetic thin-film head is improved by forming a multiple-gap head with separate magnetic core and coil for a read head and a write head that are respectively designed to improve reading and writing performance.

In accordance with an embodiment of the present invention, a thin film magnetic head includes a thin-film magnetic core including a read core portion and an interconnected write core portion, a thin-film read coil encircling the read core portion, and a thin-film write coil encircling the write core portion. The read core portion has a read gap and the write core portion has a write gap. The read gap and write gap are mutually combined in close proximity in abutting sections of the read core portion and the write core portion respectively so that a magnetic medium is accessible to the read gap and the write gap simultaneously.

In accordance with another embodiment of the present invention, a thin film magnetic head includes a substrate having a planar surface, a thin-film magnetic core connected to the substrate, a thin-film read coil encircling the central pole and the read side pole, and a thin-film write coil encircling the write side pole. The thin-film magnetic core includes a read core portion and a write core portion. The read core portion further includes a read base core plate, a read top core plate, a central pole, and a read side pole. The read base core plate is formed on and parallel to the planar surface and has a central end and a read lateral end. The central pole has a base end and a top end with the base end attached to the central end of the read base core plate and extending essentially perpendicular to the read base core plate. The read side pole has a base end and a top end with the base end attached to the read lateral end of the read base core plate and extending essentially perpendicular to the read base core plate. The read top core plate has a read lateral end and a central end with the read lateral end attached to the top end of the read side pole. The read top core plate extends essentially parallel to the read base core plate and is attached to the top end of the central side pole. The read top core plate is separated by a read gap. The write core portion further includes the central pole which is shared with the read core portion, a write base core plate, a write top core plate, and a write side pole. The write base core plate has a write lateral end and a central end attached to the central pole between the base end and top end of the central pole. The write base core plate extends essentially parallel to the substrate planar surface. The write side pole has a base end and a top end with the base end attached to the write lateral end of the write base core plate. The write side pole extends essentially perpendicular to the write base core plate. The write top core plate has a write lateral end and a central end with the write lateral end attached to the top end of the write side pole. The write top core plate extends essentially parallel to the write base core plate and is attached to the top end of the central side pole. The write top core plate is separated by a write gap.

In accordance with a further embodiment of the present invention, a thin film magnetic head includes a multiple-pole, multiple-gap magnetic core, a first coil encircling a first pole of the multiple-pole, multiple-gap magnetic core to access a first gap of the multiple-pole, multiple-gap magnetic core, and a second coil encircling a second pole of the multiple-pole, multiple-gap magnetic core to access a second gap of the multiple-pole, multiple-gap magnetic core. The first coil has a greater number of turns than the second coil.

Many advantages are gained by the described thin-film magnetic recording and playback heads having a multiple-gap structure and combined read and write heads. The described structure advantageously combines read and write heads into a compact volume utilizing a single combined magnetic core. The multiple-gap thin-film head includes a read gap and a write gap that are advantageously positioned in close proximity so that a playback and recording media passes at a very small distance for both reading and writing. The multiple-gap thin-film magnetic head structure advantageously utilizes reductions in head volume, core size, and coil size of the write head and advantageously allocates conserved substrate space for usage by the read head. The number of read magnetic coils is advantageously increased with less resistance. The magnetic head thereby generates a higher-amplitude read signal since the signal is proportional to the number of turns in the coil. The design allows a larger read center pole and larger read side poles which improves the reading high-frequency response and improves read head efficiency. The multiple-gap thin-film head utilizes a read magnetic coil structure including multiple planar spiral coils, each with a limited number of turns, advantageously reducing the resistance per turn of coil, thereby increasing read signal amplitude and improving signal to noise ratio, while limiting coil resistance.

The dual-coil structure of the read head advantageously exploits a reduction of the total space consumed by dual planar coils to a minimum through usage of two coils that include the same number of turns. The equal size of the dual coils also advantageously results in the shortest total coil length, the lowest electrical resistance, and an optimum signal quality.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE ILLUSTRATIVE EMBODIMENTS

Figure 1:
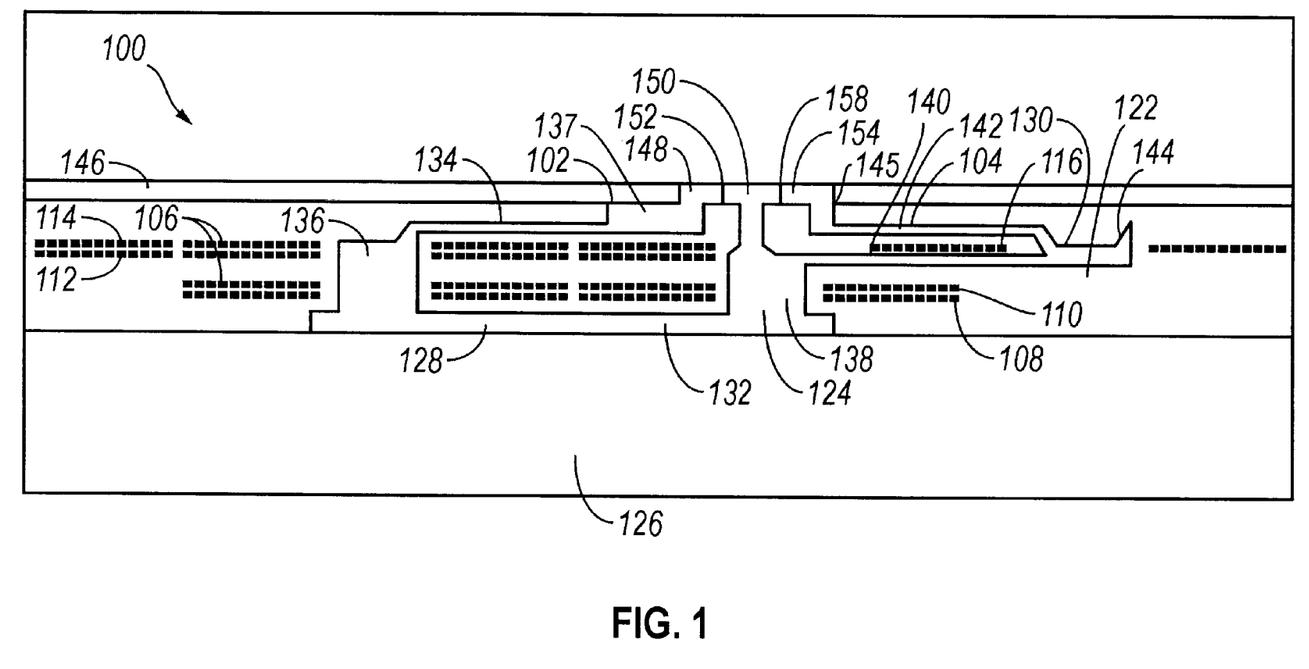
FIG. 1 is a cross sectional view of a multiple-gap thin film magnetic head having two planar heads including a read head and a write head in accordance with an embodiment of the present invention.

Referring to FIG. 1, a cross sectional view of a multiple-gap thin film magnetic head 100 having two planar heads including a read head 102 and a write head 104. The usage of separate magnetic heads for reading and writing a media, and in some embodiments for erasing a media, is advantageous in applications including stationary-head and moving-head applications. The read head 102 has four layers of read magnetic coil 106 including a first layer dual pancake coil 108, a second layer dual pancake coil 110, a third layer single pancake coil 112, and a fourth layer single pancake coil 114. A pancake coil is a coil in the shape of a planar spiral that wraps around a magnetic pole. The first layer dual pancake coil 108 and the second layer dual pancake coil 110 have a split or dual pancake coil structure. In an illustrative embodiment, each of the first layer dual pancake coil 108 and the second layer dual pancake coil 110 has a resistance of approximately 30 ohms per layer and has 30 turns with each of the dual pancake coils having 15 turns. The third layer single pancake coil 112 and the fourth layer single pancake coil 114 have a single pancake coil structure. In the illustrative embodiment, each of the third layer single pancake coil 112 and the fourth layer single pancake coil 114 has a resistance of approximately 38 ohms per layer and has 30 turns. The illustrative read magnetic coil 106 includes a total of 120 turns and has a total estimated resistance of 136 ohms.

The write head 104 has a single layer write magnetic coil 116 which, in the illustrative embodiment, is a 20 turn pancake coil with a center tap.

The read coil 106 and the single layer write coil 116 are formed using conventional thin-film fabrication techniques. In one example, the read coil 106 and write coil 116 are formed by sputtering a seed layer (not shown) on an insulative body 122 to form a plating base, depositing and patterning a photoresist layer (not shown) on the seed layer, then plating a metal coil layer in the open regions of the seed layer. In an illustrative embodiment, chromium copper (CrCu) is sputtered onto the insulative body 122 to serve as the seed layer and copper is plated onto the seed layer to form a metal coil.

The read coil 106 and the single layer write coil 116 are formed within the framework of a magnetic yoke 124 which forms a magnetic core. Coils of the read magnetic coil 106 and single layer write magnetic coil 116 are mutually insulated and insulated from the magnetic yoke 124 by the insulative body 122. The insulative body 122 is formed in several layers overlying the substrate 126. In an illustrative embodiment, various layers of the insulative body 122 are formed by depositing a layer of photoresist, patterning the photoresist layer, and etching regions of the photoresist insulative layer that are to be replaced by portions of the magnetic yoke 124, the read coil 106, the single layer, write coil 116, and other structures such as connective members. The photoresist insulative layers are electron beam cured to construct a planar surface upon which additional layers of insulative photoresist, copper for forming the coils, and nickel-iron (NiFe) for forming the magnetic yoke 124 are formed.

Figure 2:
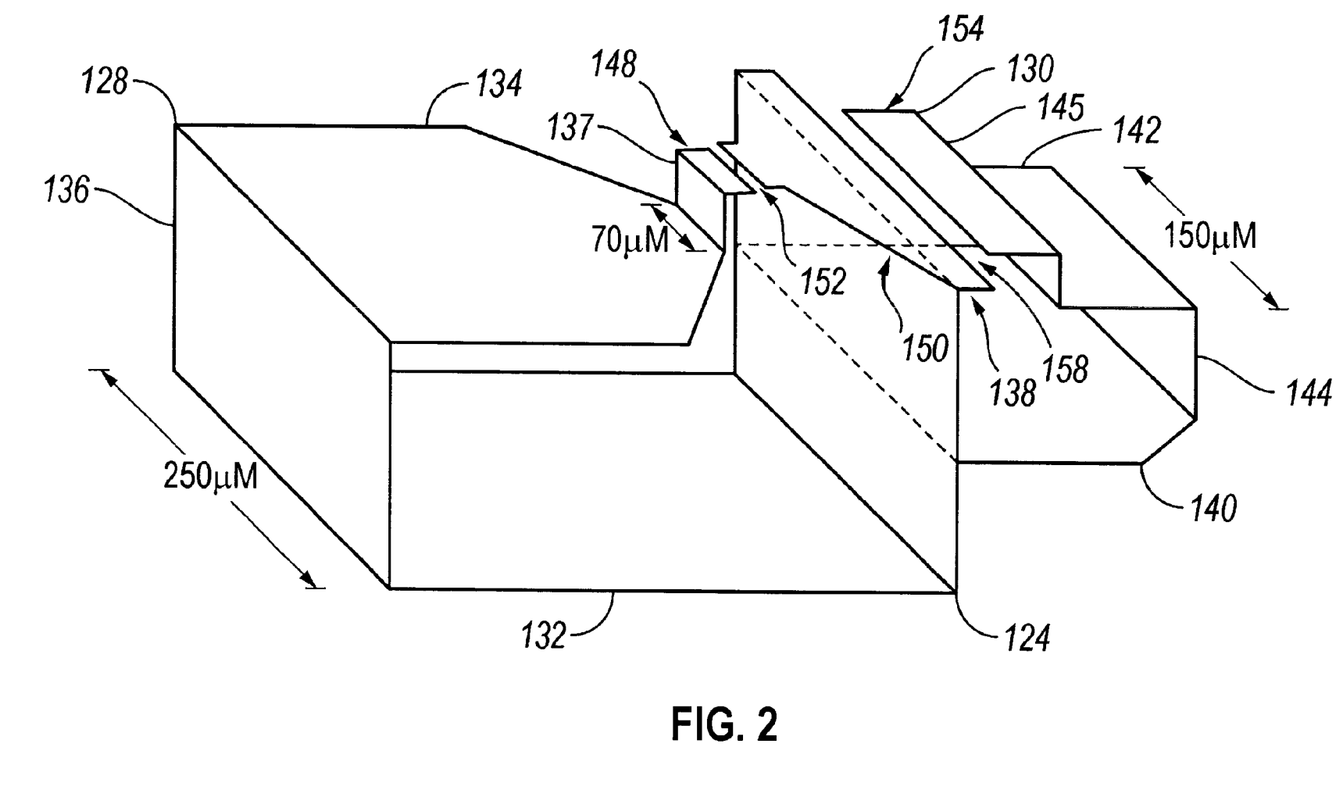
FIG. 2 is a perspective three dimensional view showing an embodiment of a magnetic core or yoke, the three dimensional view is useful in combination with FIG. 1 for illustrating the combined structure of a magnetic yoke, a read magnetic coil, and a write magnetic coil.
Figure 3:
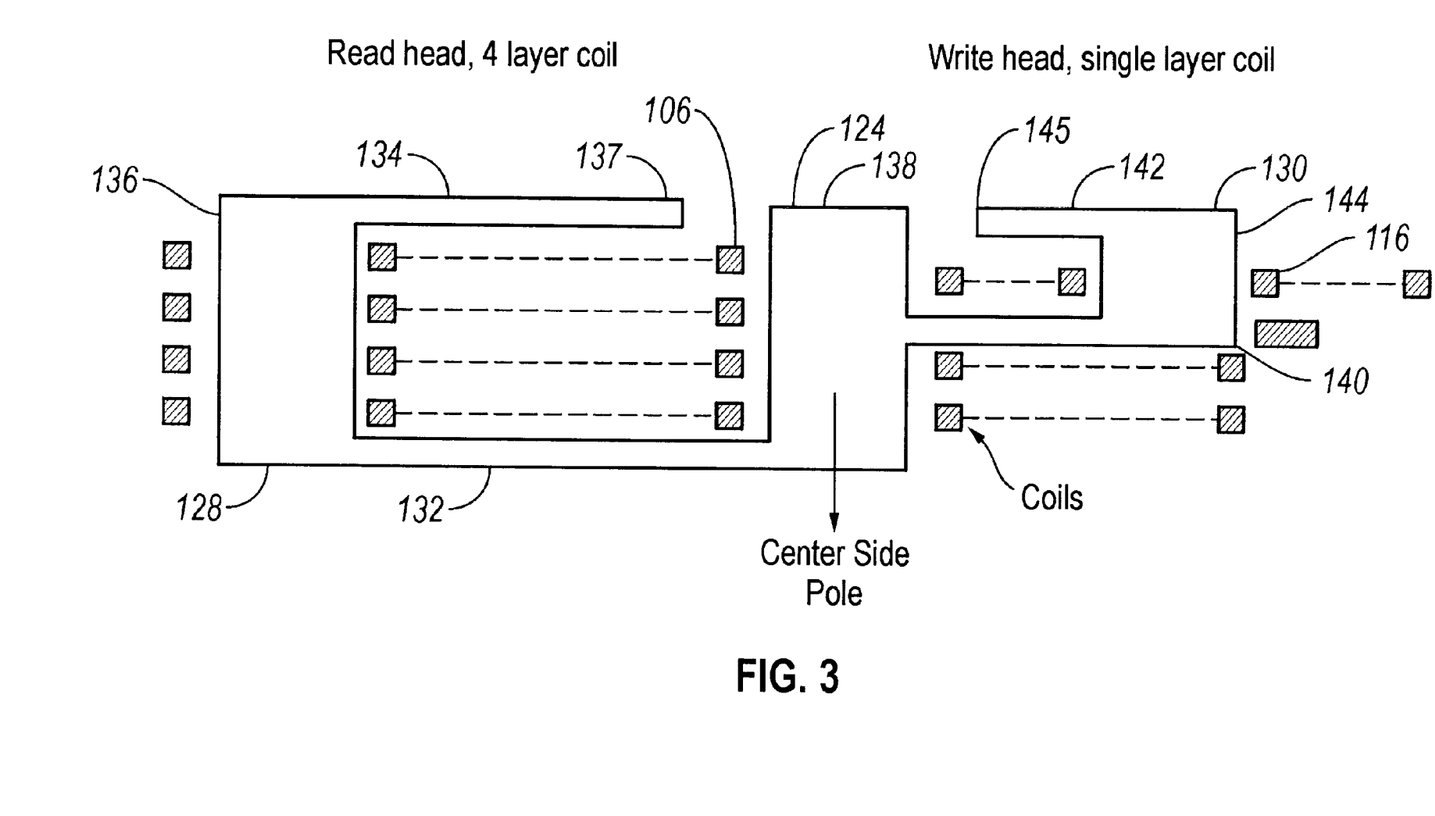
FIG. 3 is a cross sectional view showing an embodiment of the magnetic core or yoke shown in FIG. 2 illustrating the combined structure of a magnetic yoke, a read magnetic coil, and a write magnetic coil.

FIG. 2 depicts a perspective three dimensional view of the magnetic yoke 124 and FIG. 3 shows a cross sectional view of the magnetic yoke 124 which are useful in combination with FIG. 1 for illustrating the combined structure of the magnetic yoke 124, the read coil 106, and the single layer write coil 116. The magnetic yoke 124 is formed using an electroplating technique. In one embodiment, the magnetic yoke 124 is formed by sputtering a seed layer (not shown) onto a substrate 126, depositing and patterning a photoresist layer (not shown) onto the seed layer, stripping the photoresist to lift off the seed layer in areas that are covered by the photoresist, the electroplating a magnetic material such as nickel-iron (NiFe) onto the seed layer. A suitable seed layer is formed by sputtering chromium-nickel vanadium (Cr-NiV) onto the substrate 126.

The magnetic yoke 124 (magnetic core) includes a read magnetic yoke 128 (read core) and a write magnetic yoke 130 (write core). The read magnetic yoke 128 includes a bottom read yoke piece 132, a top read yoke piece 134, and a multiple-pole structure including a read side pole 136, a read pole 137, and a central pole 138. The top pole includes a read magnetic top pole 148, a read gap 152, a center magnetic top pole 150, a write gap 158 and a write magnetic top pole 154, in combination forming the multipole gap of the head. The write magnetic yoke 130 includes a bottom write yoke piece 140, a top write yoke piece 142, a write side pole 144, a write yoke pole 145, and the central pole 138. The central pole 138 is shared by and forms a boundary between the read magnetic yoke 128 and the write magnetic yoke 130. The central pole 138 has a general form of a rectangular plate that extends generally perpendicular to the illustrative horizontal planar surface of the substrate 126. The bottom read yoke piece 132 extends from the lower end of the central pole 138 in a horizontal plane that is parallel to the horizontal planar surface of the substrate 126. The read side pole 136 extends generally vertically from the bottom read yoke piece 132 above the substrate 126. The top read yoke piece 134 extends generally horizontally from the top of the read side pole 136 toward the central pole 138. The bottom read yoke piece 132 is longer than the top read yoke piece 134 so that the read magnetic yoke 128 has an open structure. The read yoke pole 137 extends generally vertically upward from the end of the top read yoke piece 134 that is nearest to the central pole 138 so that the read top pole 148 has a clearance from the top read yoke piece 134.

The bottom write yoke piece 140 extends from the central pole 138 at a medial vertical position of the central pole 138 in a horizontal plane that is parallel to the horizontal planar surface of the substrate 126. The bottom write yoke piece 140 extends from the central pole 138 in a direction opposite the read magnetic yoke 128. The write side pole 144 extends generally vertically from the bottom write yoke piece 140 above the substrate 126. The top write yoke piece 142 extends generally horizontally from the top of the write side pole 144 toward the central pole 138. The bottom write yoke piece 140 is longer than the top write yoke piece 142 so that the write magnetic yoke 130 has an open structure. The write yoke pole 145 extends generally vertically upward from the end of the top write yoke piece 142 that is nearest to the central pole 138. The central pole 138 has a length that is equal to the length of the read side pole 136. The vertical position of the bottom write yoke piece 140 along the central pole 138, the length of the write side pole 144 and the length of the write yoke pole 145 are selected so that the top of the write yoke pole 145, the top of the central pole 138, and the top of the read yoke pole 137 are vertically aligned.

Referring again to FIG. 1, an insulative pedestal 146 is formed overlying the top read yoke piece 134 and the top write yoke piece 142 between the central pole 138 and the read pole 137, between the central pole 138 and the write yoke pole 145, and lateral to the read pole 137 and write yoke pole 145. In the illustrative embodiment, the insulative pedestal 146 is an electrically insulative layer of photoresist that is patterned and electron beam cured. The insulative pedestal 146 is patterned to expose regions within which the read pole 137, write yoke pole 145, and upper end layers of the central pole 138 are electroplated. The insulative pedestal 146 typically has a rectangular geometry although other geometries such as circular or elliptical geometries may also be used.

Referring to FIG. 1 and FIG. 2, overlying the insulative pedestal 146, read magnetic top pole pieces 148 and center magnetic top pole 150 extend horizontally between the read yoke pole 137 and the central pole 138. The read magnetic pole pieces 148 and 150 are separated by a read gap 152. Also overlying the insulative pedestal 146 are write magnetic top pole pieces 154 which extend horizontally from write yoke pole 145 toward the central pole 138 and are separated by a write gap 158 from the center magnetic top pole 150. The size of the write gap 158 and the read gap 152 determined the recording density of the multiple-gap thin film magnetic head 100. A gap size on the order of about 1 $\mu$m is typical. For a relatively wide gap, a more diffuse flux is created and detected, increasing the width of data tracks and resulting in sparsely distributed data. For a relatively narrow gap, magnetic flux lines are tightened so that more confined magnetic domains are created, forming thinner tracks with more bits stored per track.

In the illustrative embodiment, magnetic yoke 124 has a length of approximately 450 $\mu$m, a width of approximately 250 $\mu$m, and a height of approximately 30 $\mu$m. The length of the magnetic yoke 124 is selected to accommodate the dimension of the coils. The width of the magnetic yoke 124 is chosen to attain a selected read head efficiency and read coil resistance. The height of the combined read side pole 136 and the read pole 137 is approximately equal to the height of the central pole 138 (approximately 30 $\mu$m) and selected to determine the magnetic properties of the side poles. The read magnetic yoke 128 extends approximately 250 $\mu$m of the length of the magnetic yoke 124 and the write magnetic yoke 130 extends the remaining 200 $\mu$m. The top read yoke piece 134, the bottom read yoke piece 132, the first read side pole 136 and the second read side pole 138 have the same width of approximately 250 $\mu$m with the bottom read yoke piece 132 having a rectangular shape but the top read yoke piece 134 tapering at a 45° angle to a width of approximately 70 $\mu$m toward the central pole 138. In the illustrative embodiment, the top read yoke piece 134 is tapered to fit either a 50 $\mu$m or 62 $\mu$m track width. The top portion of the central pole 138 is tapered toward the read gap 152 to fit the read track width of 50 $\mu$m and the width toward the write gap 158 is maintained as rectangle for wider write track width.

In the illustrative embodiment, the width of the write head 104 is 150 $\mu$m. While the width of the read head 102 is optimized to attain a desired head efficiency, the head efficiency of the write head 104 is suitable without modifying the width.

In the illustrative embodiment, the thickness of the read magnetic yoke 128 is 6.5+/−0.5 μm and the thickness of the write magnetic yoke 130 is 4.0+/−0.5 μm.

Referring to FIGS. 4A through 4D, schematic top views illustrate the single layer write magnetic coil 116 and the four layers of read magnetic coil 106 including a first layer dual pancake coil 108, a second layer dual pancake coil 110, a third layer single pancake coil 112, and a fourth layer single pancake coil 114.

Figure 4A:
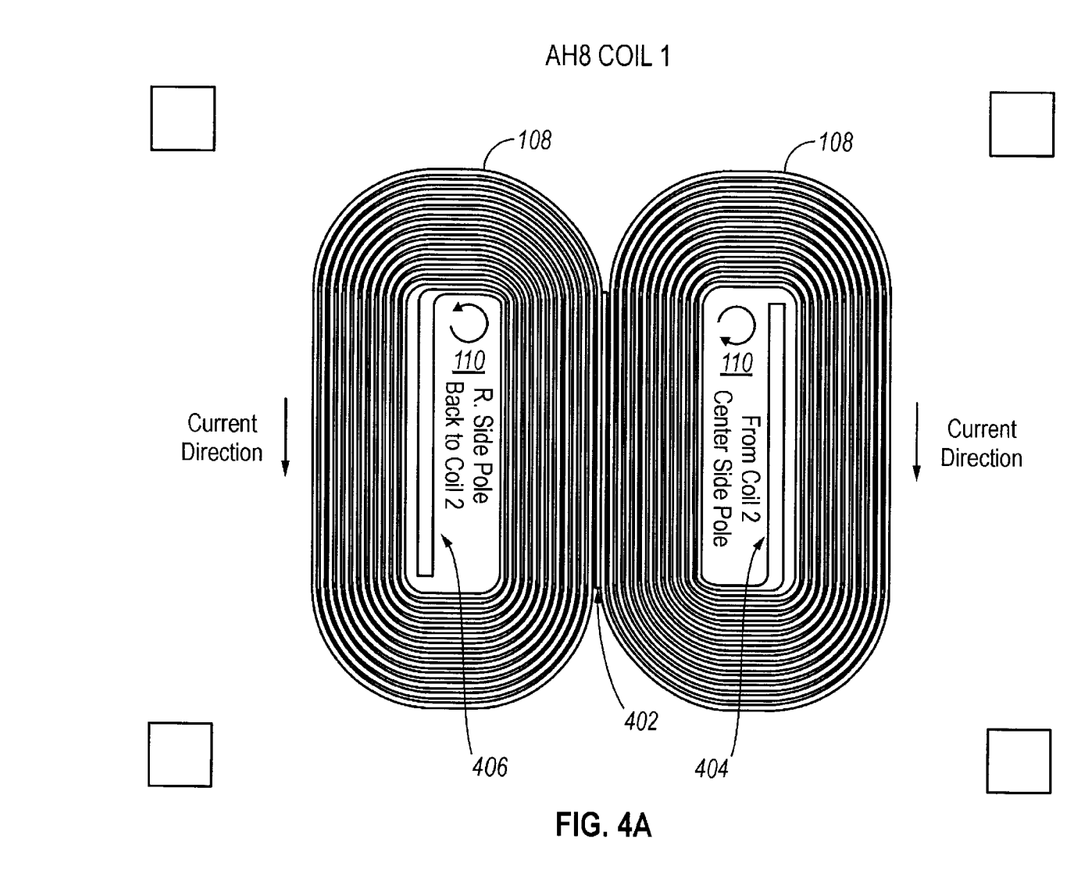
FIGS. 4A through 4D depict a series of schematic overhead views illustrating a single layer write magnetic coil and four layers of a read magnetic coil in the multiple-gap thin-film magnetic head shown in FIG. 1.

Referring to FIG. 4A in conjunction with FIGS. 1–3, the first layer dual pancake coil 108 includes one 15-turn read coil that encircles the central pole 138 and another 15-turn read coil that encircles the read side pole 136. The two 15-turn read coils of the first layer dual pancake coil 108 are interconnected at the outermost coil by a connective member 402. Each of the two 15-turn read coils of the first layer dual pancake coil 108 are connected to the second layer dual pancake coil 110 at the innermost coil. The first layer dual pancake coil 108 encircling the central pole 138 is connected to the second layer dual pancake coil 110 by a connective member 404 and the first layer dual pancake coil 108 encircling the read side pole 136 is connected to the second layer dual pancake coil 110 by a connective member 406.

Figure 4B:
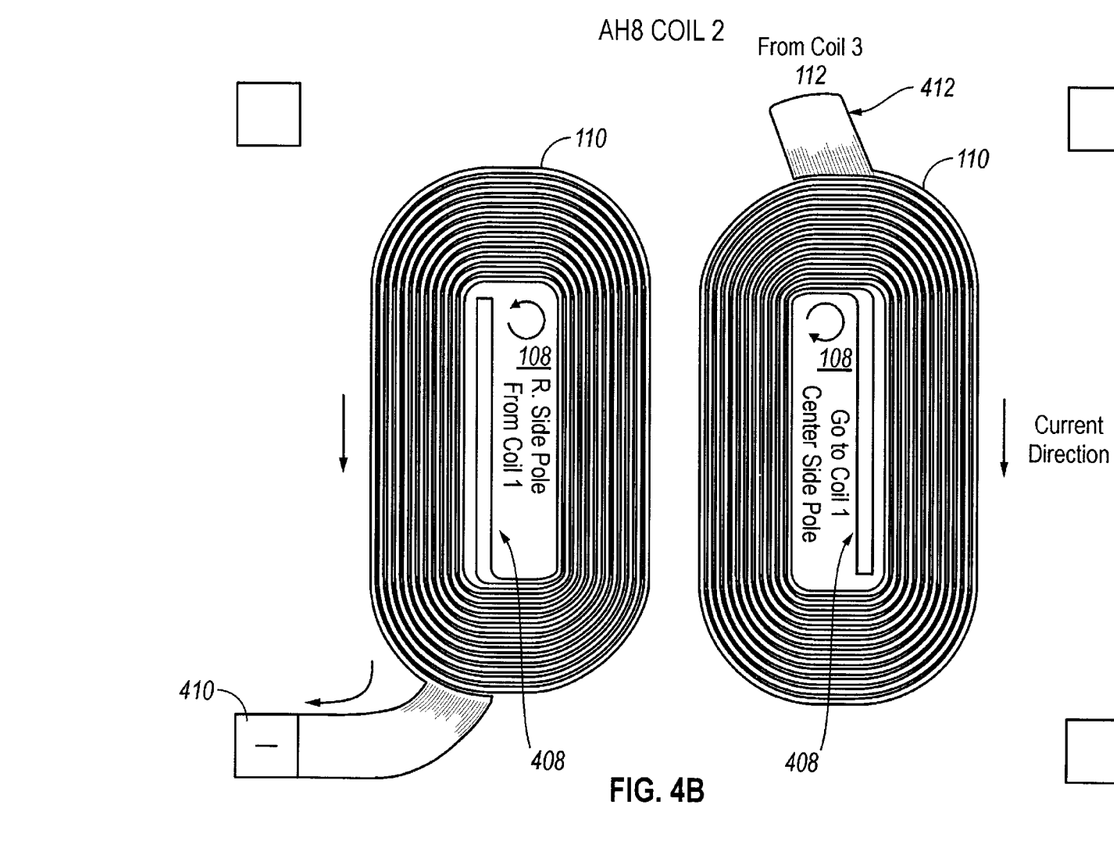

Referring to FIG. 4B in conjunction with FIGS. 1–3, the second layer dual pancake coil 110 also includes one coil that encircles the central pole 138 and another coil that encircles the read side pole 136. Each of the two 15-turn read coils of the second layer dual pancake coil 110 are connected to the first layer dual pancake coil 108 at the innermost coil by a connective member 408. The coil of the second layer dual pancake coil 110 that encircles the read side pole 136 is connected to a read coil cathode terminal 410. The coil of the second layer dual pancake coil 110 that encircles the central pole 138 is connected to the third layer single pancake coil 112 by a connective member 412.

Figure 4C:
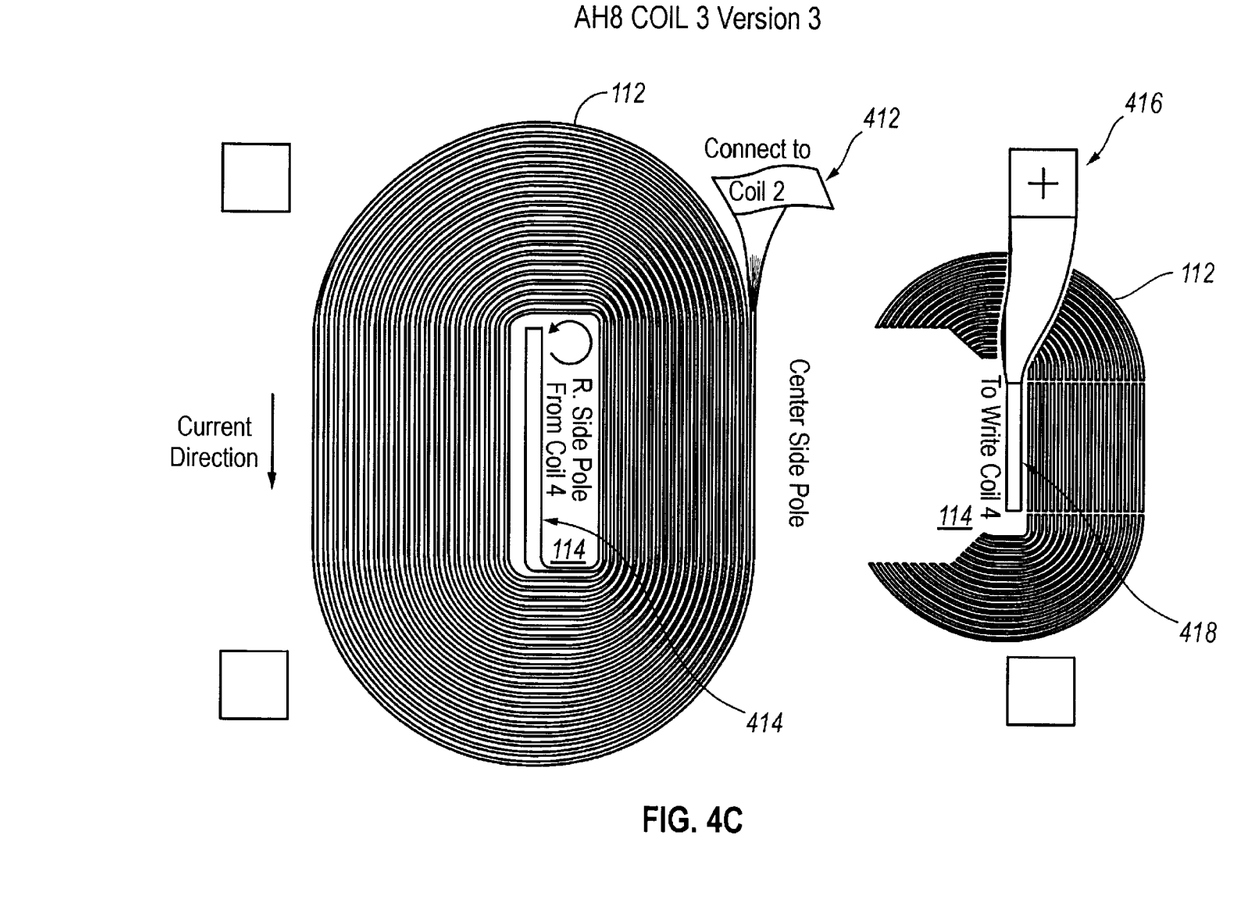

Referring to FIG. 4C in conjunction with FIGS. 1–3, the third layer single pancake coil 112 is a 30-turn read coil that encircles the read side pole 136. The outermost coil of the third layer single pancake coil 112 is connected to the second layer dual pancake coil 110 by the connective member 412. The innermost coil of the third layer single pancake coil 112 is connected to the fourth layer single pancake coil 114 by a connective member 414. Also on the third level of the multiple-gap thin film magnetic head 100, the single layer write magnetic coil 116 has a write coil anode terminal 416 which is connected to the fourth layer single pancake coil 114 by a connective member 418.

Figure 4D:
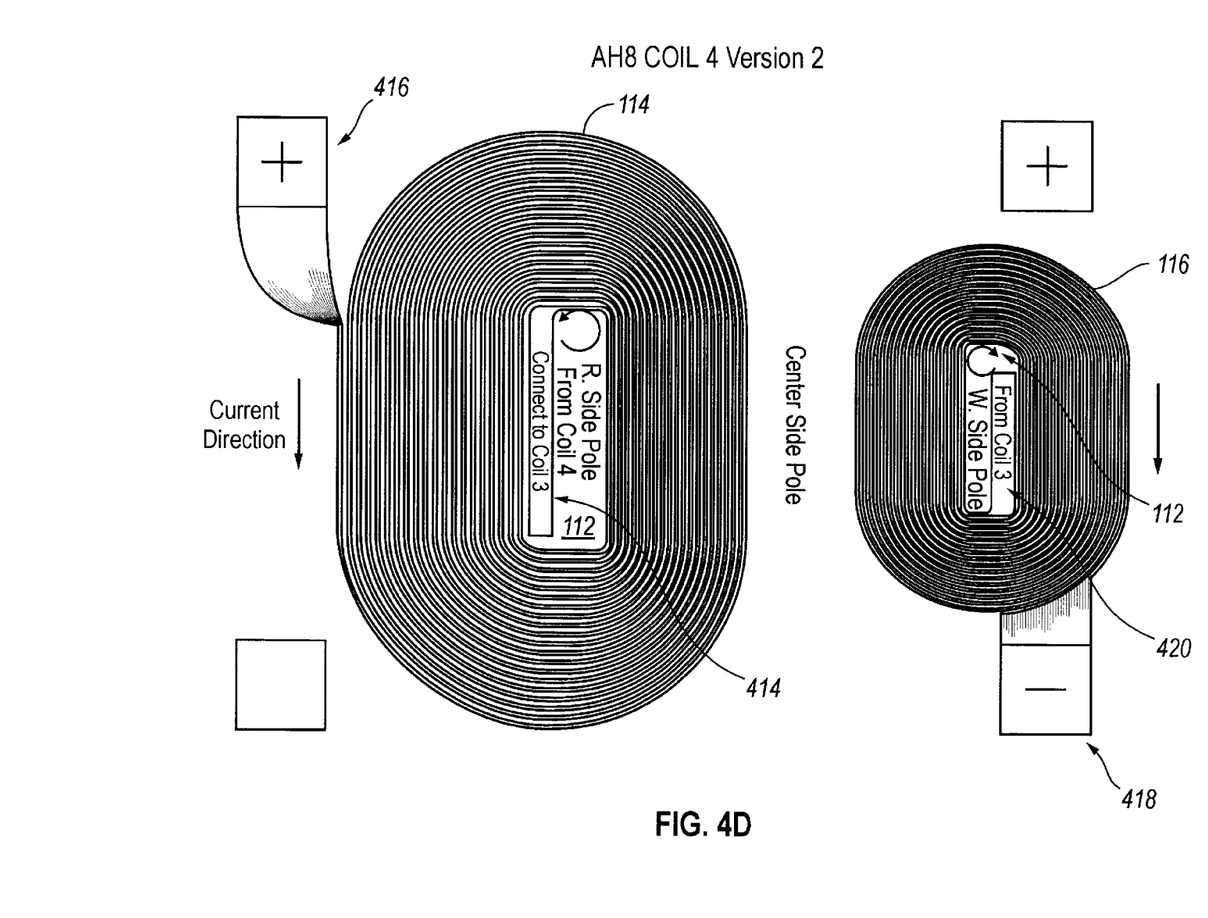

Referring to FIG. 4D in conjunction with FIGS. 1–3, the fourth layer single pancake coil 114 is a 30-turn coil that encircles the read side pole 136. The innermost coil of the fourth layer single pancake coil 114 is connected to the third layer single pancake coil 112 by the connective member 414. The outermost coil of the fourth layer single pancake coil 114 is connected to a read coil anode terminal 416. The single layer write magnetic coil 116 is also formed on the fourth level of the multiple-gap thin film magnetic head 100. The single layer write magnetic coil 116 is a 20-turn coil that encircles the write side pole 144. The outermost coil of the single layer write magnetic coil 116 is connected to a write coil cathode terminal 418. The innermost coil of the single layer write magnetic coil 116 is connected to the write coil anode terminal 416 by the connective member 420.

Lateral to the read magnetic top pole pieces 148, center magnetic top pole 150, and the write magnetic top pole pieces 154, a hard protective layer 160 is deposited overlying the insulative pedestal 146. In an illustrative embodiment, the hard protective layer 160 is constructed from a hard material such as diamond-like carbon (DLC). A DLC layer is typically formed by depositing a thin silicon adhesion layer (not shown), sputter cleaning the silicon adhesion layer with Argon gas in a plasma-enhanced chemical vapor deposition (PECVD) system, then changing the deposition gas from Argon to a liquid hydrocarbon diamond-like carbon (DLC) source to deposit the DLC layer by PECVD. Diamond-like carbon (DLC) is also deposited into the read gap 152 and the write gap 158 to form a read gap DLC layer (not shown) and a write gap DLC layer (not shown), respectively.

The read gap 152 and write gap 158 are advantageously positioned in close proximity so that a media passes at a very small distance for both reading and writing. The read head 102 and write head 104 are advantageously combined in a compact structure while permitting very different structures for the read magnetic yoke 128 and read magnetic coil 106 in comparison to the write magnetic yoke 130 and single layer write magnetic coil 116. The read head 102 and write head 104 are designed to incorporate very different specifications to achieve optimum reading and optimum writing performance. In particular, to attain a desired read and write performance a very different number of turns are used for the read magnetic coil 106 and the single layer write magnetic coil 116. In the illustrative embodiment, 120 turns are used in the read magnetic coil 106 while 20 turns are used in the single layer write magnetic coil 116. The head volume, core size, and coil size of the write head 104 are advantageously reduced and allocated for usage in the read head 102. The size of the read coil 106 is advantageously constrained to allow more turns in compacted space and thereby generate a higher-amplitude read signal since the signal is proportional to the number of turns in the coil. The increased size of the read magnetic coil 106 also improves the reading high-frequency response and improves read head efficiency. The illustrative read magnetic coil 106 structure including multiple planar spiral coils, each with a limited number of turns, advantageously increases the number of turns, thereby increasing read signal amplitude and improving signal to noise ratio, while limiting coil resistance.

The size of the write head 104 is reduced and allocated to the read head 102 so that the read head 102 is made larger while the size of the entire multiple-gap thin film magnetic head 100 is reduced.

The geometry and materials of the write magnetic yoke 130 are selected to attain a desired field strength at a selected signal frequency. The geometry and materials of the write magnetic yoke 130 are also selected to rapidly reduce the writing field in the direction of media motion to improve short-wavelength recording efficiency. Typically, the length of the write gap 158 is greater than the read gap 152 length. Magnetic flux is delivered to the write magnetic top pole pieces 154 and the central magnetic top pole 150 of the write head 104 using the write magnetic yoke 130 that generally has a larger cross-sectional area than the write magnetic pole pieces 154 to avoid saturation in the yoke region. The single layer write magnetic coil 116 is formed closely about the write side pole 144 of the write magnetic yoke 130 to improve efficiency of the inductive coupling between the single layer write magnetic coil 116 and the write magnetic top pole pieces 154.

The first and second coil layers include the first layer dual pancake coil 108 and the second layer dual pancake coil 110, both of which are allocated to the read head 102. If the first layer pancake coil 108 and second layer pancake coil 110 were formed in asymmetric coil structure, no improvement in performance would be achieved and the coil size would be very bulky. Thus, to form a most compact structure the first layer dual pancake coil 108 and the second layer dual pancake coil 110 are constructed with the same number of turns or coils. The multiple-gap thin film magnetic head 100 is an active device within a recording circuit and the magnetic yoke 124 forms a relatively large structure that generates a heavy load in the device. The write head 104 supplies a current in the single layer write magnetic coil 116, generating a magnetic field at the write gap 158. By reducing the size of the single layer write magnetic coil 116 and the magnetic structure of the write magnetic yoke 130, the current through the single layer write magnetic coil 116 drives a smaller load, advantageously improving the high-frequency response of the write head 104, improving head efficiency, and reducing leakage current.

Performance of the first layer dual pancake coil 108 and the second layer dual pancake coil 110 is improved because the total length of a dual pancake coil including two 15 turn spiral coils is the minimum length of a pair of coils having a total number of 30 turns (given that the distance between planar coils remains constant). By utilizing the minimum-length coil for a set number of turns, the electrical resistance of the coil is also at a minimum value. A coil having a minimum electrical resistance produces smallest electrical noise and therefore a better signal-to-noise ratio.

Furthermore, the total area consumed by dual planar coils is a minimum when the two coils include the same number of turns. In summary, a dual pancake coil structure in which the two coils include the same number of turns advantageously consumes the minimum area, has the shortest total coil length, has the lowest electrical resistance, and produces an optimum signal quality.

In typical implementations of a read/write thin-film magnetic head, read and write heads having an identical structure are formed in adjacent four-layer stacks and the number of write coils is reduced by failing to connect the bottom two layers of the write coil. In these implementations, one-quarter of the coil space is excluded from operation and wasted. The multiple-gap thin film magnetic head 100 advantageously utilizes the entire space of the first and second layers, reducing the volume allocated to coils.

The single layer write magnetic coil 116 is formed in a single layer in the fourth layer and has a reduced size in comparison to the read magnetic coil 106 so that one side of the magnetic yoke 124 is allocated to the write head 104 and the other side allocated to the read head 102. Thus to form a structure that improves the read performance of the read head 102 and the write performance of the write head 104, asymmetric coil structures are formed in the third and fourth layers.

Figure 5:
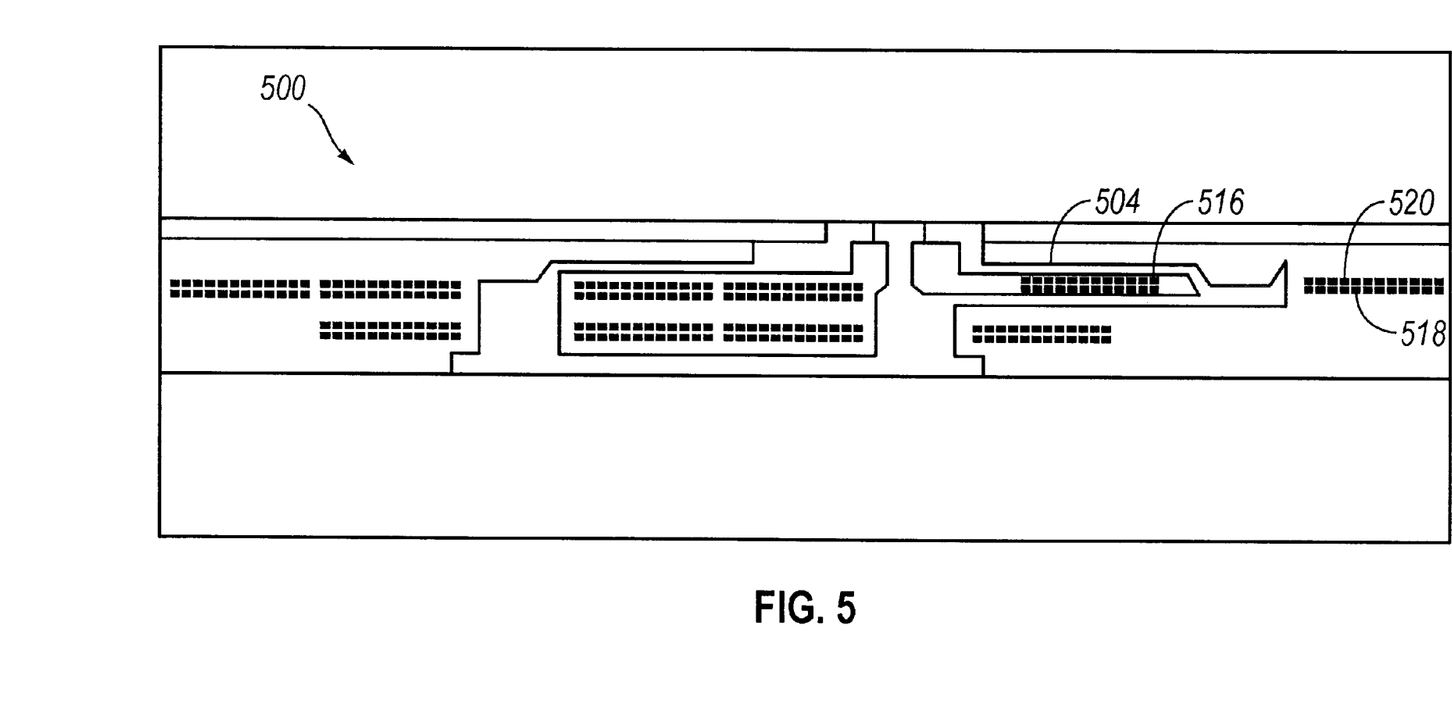
FIG. 5 is a cross sectional view showing an alternative embodiment of a multiple-gap thin film magnetic head which is similar to the multiple-gap thin film magnetic head shown in FIG. 1 but includes a write head with a two layer write magnetic coil rather than a single layer coil.

Referring to FIG. 5, a cross sectional view of an alternative embodiment of a multiple-gap thin film magnetic head 500 is similar to the multiple-gap thin film magnetic head 100 shown in FIG. 1 but includes a write head 504 with a two layer write magnetic coil 516. The two layer write magnetic coil 516 in the illustrative embodiment includes a 10 turn first layer pancake coil 518 and a 10 turn second layer pancake coil 520. Write head efficiency of the write head 504 with the two layer write magnetic coil 516 is shown by simulation to achieve approximately a twelve percent increase in write head efficiency in comparison to the write head 104 having the 20 turn single layer write magnetic coil 116. The increase in write head efficiency is gained at the expense of a more complex and therefore a more costly manufacturing process.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A thin film magnetic head comprising:
   a multiple-pole, multiple-gap magnetic core;
   a first coil encircling a first pole of the multiple-pole, multiple-gap magnetic core to access a first gap of the multiple-pole, multiple-gap magnetic core; and
   a second coil encircling a second pole of the multiple-pole, multiple-gap magnetic core to access a second gap of the multiple-pole, multiple-gap magnetic core, the first coil having a greater number of turns than the second coil, wherein:
   the first coil has a number of coil turns that is five or more times greater than the number of coil turns in the second coil.

2. A thin film magnetic head comprising:
   a thin-film magnetic core including a read core portion and an interconnected write core portion, the read core portion being separated by a read magnetic gap and the write core portion being separated by a write magnetic gap, the read gap and write gap being mutually combined in close proximity in abutting sections of the read core portion and the write core portion respectively so that a magnetic medium is accessible to the read gap and the write gap simultaneously, the thin-film magnetic core further including:
   a central pole shared by the read core portion and the write core portion;
   a read side pole; and
   a write side pole;
   a thin-film read coil encircling the read core portion; and
   a thin-film write coil encircling the write core portion.

3. A thin film magnetic head according to claim 2 wherein:
   the thin-film read coil includes a coil in the shape of a planar spiral that wraps around the central pole coupled to a coil in the shape of a planar spiral that wraps around the read pole; and
   the thin-film write coil includes a coil in the shape of a planar spiral that wraps around the write pole.

4. A thin film magnetic head according to claim 2 wherein:
   the thin-film read coil includes:
      a first layer coil including a first coil in the shape of a planar spiral that encircles the central pole and a second coil coupled to the first coil in the shape of a planar spiral that encircles the read pole;
      a second layer coil coupled to the first layer coil and including a first coil in the shape of a planar spiral that encircles the central pole and a second coil coupled to the first coil in the shape of a planar spiral that encircles the read pole;

a third layer coil coupled to the second layer coil, the third layer coil in the shape of a planar spiral that encircles the read pole; and a fourth layer coil coupled to the third layer coil, the fourth layer coil in the shape of a planar spiral that encircles the read pole; and the thin-film write coil includes:
a single layer coil in the shape of a planar spiral that encircles the write pole.

5. A thin film magnetic head according to claim 2 wherein:

the thin-film read coil includes:
a first layer coil including a first coil in the shape of a planar spiral that encircles the central pole and a second coil coupled to the first coil in the shape of a planar spiral that encircles the read pole;

a second layer coil coupled to the first layer coil and including a first coil in the shape of a planar spiral that encircles the central pole and a second coil coupled to the first coil in the shape of a planar spiral that encircles the read pole;

a third layer coil coupled to the second layer coil, the third layer coil in the shape of a planar spiral that encircles the read pole; and a fourth layer coil coupled to the third layer coil, the fourth layer coil in the shape of a planar spiral that encircles the read pole; and the thin-film write coil includes:
a first layer coil in the shape of a planar spiral that encircles the write pole; and a second layer coil coupled to the first layer coil, the second layer coil being in the shape of a planar spiral that encircles the write pole.

6. A thin film magnetic head according to claim 2 wherein:

the thin-film read coil has a number of coil turns that is greater than the number of coil turns in the thin-film write coil.

7. A thin film magnetic head according to claim 2 wherein:

the thin-film read coil has a number of coil turns that is five or more times greater than the number of coil turns in the thin-film write coil.

8. A thin film magnetic head according to claim 2, further comprising:

an insulative body formed around and mutually isolating the thin-film read coil, the thin-film write coil, and thin-film magnetic core.

9. A thin film magnetic head comprising:
a substrate having a planar surface;
a thin-film magnetic core coupled to the substrate including:
a read core portion including:
a read base core plate formed on and parallel to the planar surface and having a central end and a read lateral end;

a central pole having a base end and a top end, the base end being attached to the central end of the read base core plate and extending essentially perpendicular to the read base core plate;

a read side pole having a base end and a top end, the base end being attached to the read lateral end of the read base core plate and extending essentially perpendicular to the read base core plate;

a read top core plate having a read lateral end and a central end, the read lateral end being attached to the top end of the read side pole, extending essentially parallel to the read base core plate, and being attached to the top end of the central side pole, the read top core plate being separated by a read gap;

a write core portion including:
the central pole shared with the read core portion;
a write base core plate having a write lateral end and a central end attached to the central pole between the base end and top end of the central pole, the write base core plate extending essentially parallel to the substrate planar surface;

a write side pole having a base end and a top end, the base end being attached to the write lateral end of the write base core plate and extending essentially perpendicular to the write base core plate;

a write top core plate having a write lateral end and a central end, the write lateral end being attached to the top end of the write side pole, extending essentially parallel to the write base core plate, and being attached to the top end of the central side pole, the write top core plate being separated by a write gap;

a thin-film read coil encircling the central pole and the read side pole; and a thin-film write coil encircling the write side pole.

10. A thin film magnetic head according to claim 9, further comprising:

an insulative body formed around and mutually isolating the thin-film read coil, the thin-film write coil, and thin-film magnetic core.

11. A thin film magnetic head according to claim 9, wherein:

the thin-film read coil includes a coil in the shape of a planar spiral that wraps around the central pole coupled to a coil in the shape of a planar spiral that wraps around the read side pole; and the thin-film write coil includes a coil in the shape of a planar spiral that wraps around the write side pole.

12. A thin film magnetic head according to claim 11 wherein:

the thin-film read coil includes:
a first layer coil including a first coil in the shape of a planar spiral that encircles the central pole and a second coil coupled to the first coil in the shape of a planar spiral that encircles the read side pole;

a second layer coil coupled to the first layer coil and including a first coil in the shape of a planar spiral that encircles the central pole and a second coil coupled to the first coil in the shape of a planar spiral that encircles the read side pole;

a third layer coil coupled to the second layer coil, the third layer coil in the shape of a planar spiral that encircles the read side pole; and a fourth layer coil coupled to the third layer coil, the fourth layer coil in the shape of a planar spiral that encircles the read side pole; and the thin-film write coil includes:
a single layer coil in the shape of a planar spiral that encircles the write side pole.

13. A thin film magnetic head according to claim 11 wherein:

the thin-film read coil includes:
a first layer coil including a first coil in the shape of a planar spiral that encircles the central pole and a second coil coupled to the first coil in the shape of a planar spiral that encircles the read side pole;

a second layer coil coupled to the first layer coil and including a first coil in the shape of a planar spiral that encircles the central pole and a second coil coupled to the first coil in the shape of a planar spiral that encircles the read side pole;

a third layer coil coupled to the second layer coil, the third layer coil in the shape of a planar spiral that encircles the read side pole; and a fourth layer coil coupled to the third layer coil, the fourth layer coil in the shape of a planar spiral that encircles the read side pole; and the thin-film write coil includes:

a first layer coil in the shape of a planar spiral that encircles the write side pole; and a second layer coil coupled to the first layer coil, the second layer coil being in the shape of a planar spiral that encircles the write side pole.

14. A thin film magnetic head according to claim 9 wherein:

the thin-film read coil has a number of coil turns that is greater than the number of coil turns in the thin-film write coil.

15. A thin film magnetic head according to claim 9 wherein:

the thin-film read coil has a number of coil turns that is five or more times greater than the number of coil turns in the thin-film write coil.

16. A thin film magnetic head according to claim 9 wherein:

the read gap and write gap are mutually combined in close proximity in abutting sections of the read core portion and the write core portion respectively so that a magnetic medium is accessible to the read gap and the write gap simultaneously.

17. A magnetic head comprising:

an integral magnetic core comprising multiple poles and multiple gaps, one or more of the multiple gaps being disposed between ones of the multiple poles that are shared between gaps;

a first coil encircling a first pole of the multiple-pole, multiple-gap magnetic core; and a second coil encircling a second pole of the multiple-pole.

18. A magnetic head according to claim 17 wherein:

the first coil has a greater number of turns than the second coil.

19. A magnetic head according to claim 18 wherein:

the first coil is a read coil and the second coil is a write coil.

20. A magnetic head according to claim 18 wherein:

the first coil has a number of coil turns that is five or more times greater than the number of coil turns in the second coil.

21. A magnetic head according to claim 18 wherein:

the first coil includes a plurality of planar spiral coils, each planar spiral coil of the first coil including a plurality of turns.

22. A magnetic head according to claim 18 wherein:

the first coil includes a plurality of planar spiral coils, the plurality of planar spiral coils including planar spiral coils encircling a plurality of the multiple-poles in a single planar layer of the multiple-pole, multiple-gap magnetic core, and including planar spiral coils encircling a pole in multiple planar layers of the multiple-pole, multiple-gap magnetic core.

23. A magnetic head comprising:

a magnetic core including a read core portion and a write core portion integral with the read core portion, the read core portion being separated by a read gap and the write core portion being separated by a write gap, the read gap and write gap being separated by a shared pole piece of the magnetic core;

a thin-film read coil encircling the read core portion; and a thin-film write coil encircling the write core portion.

24. A magnetic head according to claim 23 wherein: the magnetic core is a thin-film magnetic core.

25. A magnetic head according to claim 23 wherein:

the read core portion and the write core portion are mutually combined in close proximity in abutting sections so that a magnetic medium is accessible to the read gap and the write gap simultaneously.

* * * * *